(12) United States Patent
Pearlman et al.

(10) Patent No.: US 7,301,738 B2
(45) Date of Patent: Nov. 27, 2007

(54) METHOD AND APPARATUS FOR MINIMALLY INVASIVE NETWORK MONITORING

(75) Inventors: Marc Robert Pearlman, Clifton Park, NY (US); Emad Andarawis Andarawis, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 830 days.

(21) Appl. No.: 10/373,571

(22) Filed: Feb. 25, 2003

(65) Prior Publication Data

US 2004/0078463 A1 Apr. 22, 2004

Related U.S. Application Data (60) Provisional application No. 60/438,159, filed on Jan. 6, 2003, provisional application No. 60/359,544, filed on Feb. 25, 2002.

(51) Int. Cl.
*H02H 3/00* (2006.01)

(52) U.S. Cl. .......................... 361/42; 340/638; 700/292

(58) Field of Classification Search ........ 709/223–224; 714/4; 370/216, 229; 340/310.11, 853.2, 340/638; 700/2, 286, 292; 307/52; 361/42, 361/62, 64

See application file for complete search history.

(56) References Cited

U.S. PATENT DOCUMENTS

| | | | |
|---|---|---|---|
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |
| 4,415,968 A | 11/1983 | Maeda et al. | |
| 4,423,459 A | 12/1983 | Stich et al. | |

(Continued)

FOREIGN PATENT DOCUMENTS

EP 0718948 A2 6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Moustafa Meky
(74) *Attorney, Agent, or Firm*—Ohlandt, Greeley, Ruggiero & Perle, L.L.P.

(57) ABSTRACT

A method and apparatus for monitoring a communication network is provided. The network includes a plurality of node electronics units communicatively coupled to at least one central control processing unit through at least one network wherein each network includes a network switch. The method includes coupling a monitoring domain to the network, and receiving at least one of network traffic transmitted on at least one of the monitored links, and network traffic received on at least one of the monitored links through at least one monitoring link. The apparatus includes a plurality of node electronics units communicatively coupled to at least one central control processing unit through at least one network wherein each network includes a network switch, and wherein the apparatus comprises a monitoring domain.

39 Claims, 9 Drawing Sheets

U.S. PATENT DOCUMENTS

| | | |
|---|---|---|
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,049,873 A * | 9/1991 | Robins et al. .......... 340/825.01 |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,808,847 A * | 9/1998 | Ferrazzi ..................... 361/93.9 |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A * | 4/1999 | Reid et al. .................. 340/639 |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A * | 3/2000 | Alexander et al. ............ 702/67 |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,067,218 A * | 5/2000 | Suptitz ....................... 361/97 |
| 6,084,758 A | 7/2000 | Clarey et al. |
| 6,108,685 A * | 8/2000 | Kutzik et al. ................ 709/200 |

| | | | | | | |
|---|---|---|---|---|---|---|
| 6,138,241 | A | 10/2000 | Eckel et al. | 6,718,481 B1 * | 4/2004 | Fair .................................. 714/4 |
| 6,139,327 | A | 10/2000 | Callahan et al. | 6,751,562 B1 * | 6/2004 | Blackett et al. ................. 702/61 |
| 6,141,196 | A | 10/2000 | Premerlani et al. | 6,788,508 B2 * | 9/2004 | Papallo et al. .................. 361/64 |
| 6,157,527 | A | 12/2000 | Spencer et al. | 6,822,555 B2 * | 11/2004 | Mansfield et al. ...... 340/538.11 |
| 6,167,329 | A | 12/2000 | Engel et al. | 6,853,316 B2 * | 2/2005 | Payson et al. ................. 340/999 |
| 6,175,780 | B1 | 1/2001 | Engel | 2001/0010032 A1 | 7/2001 | Ehlers et al. |
| 6,185,482 | B1 | 2/2001 | Egolf et al. | 2001/0032025 A1 | 10/2001 | Lenz et al. |
| 6,185,508 | B1 | 2/2001 | Van Doorn et al. | 2001/0044588 A1 | 11/2001 | Mault |
| 6,186,842 | B1 | 2/2001 | Hirschbold et al. | 2001/0048354 A1 | 12/2001 | Douville et al. |
| 6,195,243 | B1 | 2/2001 | Spencer et al. | 2001/0055965 A1 | 12/2001 | Delp et al. |
| 6,198,402 | B1 | 3/2001 | Hasegawa et al. | 2002/0010518 A1 | 1/2002 | Reid et al. |
| 6,212,049 | B1 | 4/2001 | Spencer et al. | 2002/0021665 A1 * | 2/2002 | Bhagavath et al. .......... 370/229 |
| 6,233,128 | B1 | 5/2001 | Spencer et al. | 2002/0032535 A1 | 3/2002 | Alexander et al. |
| 6,236,949 | B1 | 5/2001 | Hart | 2002/0034086 A1 | 3/2002 | Scoggins et al. |
| 6,242,703 | B1 | 6/2001 | Castonguay et al. | 2002/0045992 A1 | 4/2002 | Shincovich et al. |
| 6,268,991 | B1 | 7/2001 | Criniti et al. | 2002/0059401 A1 | 5/2002 | Austin |
| 6,285,292 | B1 * | 9/2001 | Suptitz et al. ............... 340/657 | 2002/0063635 A1 | 5/2002 | Shincovich |
| 6,285,917 | B1 | 9/2001 | Sekiguchi et al. | 2002/0064010 A1 | 5/2002 | Nelson et al. |
| 6,288,882 | B1 | 9/2001 | Criniti et al. | 2002/0091949 A1 | 7/2002 | Ykema |
| 6,289,267 | B1 | 9/2001 | Alexander et al. | 2002/0094799 A1 | 7/2002 | Elliot et al.. |
| 6,291,911 | B1 | 9/2001 | Dunk et al. | 2002/0107615 A1 | 8/2002 | Bjorklund |
| 6,292,340 | B1 | 9/2001 | O'Regan et al. | 2002/0108065 A1 | 8/2002 | Mares |
| 6,292,717 | B1 | 9/2001 | Alexander et al. | 2002/0109722 A1 | 8/2002 | Rogers et al. |
| 6,292,901 | B1 | 9/2001 | Lys et al. | 2002/0111980 A1 | 8/2002 | Miller et al. |
| 6,297,939 | B1 | 10/2001 | Bilac et al. | 2002/0116092 A1 | 8/2002 | Hamamatsu et al. |
| 6,313,975 | B1 | 11/2001 | Dunne et al. | 2002/0124011 A1 | 9/2002 | Baxter et al. |
| 6,341,054 | B1 | 1/2002 | Walder et al. | 2002/0146076 A1 | 10/2002 | Lee |
| 6,347,027 | B1 | 2/2002 | Nelson et al. | 2002/0146083 A1 | 10/2002 | Lee et al. |
| 6,351,823 | B1 | 2/2002 | Mayer et al. | 2002/0147503 A1 | 10/2002 | Osburn, III |
| 6,356,422 | B1 | 3/2002 | Bilac et al. | 2002/0159402 A1 | 10/2002 | Binder |
| 6,356,849 | B1 | 3/2002 | Jaffe | 2002/0162014 A1 | 10/2002 | Przydatek et al. |
| 6,369,996 | B1 | 4/2002 | Bo | 2002/0163918 A1 | 11/2002 | Cline |
| 6,377,051 | B1 | 4/2002 | Tyner et al. | 2002/0165677 A1 | 11/2002 | Lightbody et al. |
| 6,385,022 | B1 | 5/2002 | Kulidjian et al. | 2002/0181174 A1 | 12/2002 | Bilac et al. |
| 6,396,279 | B1 | 5/2002 | Gruenert | 2002/0193888 A1 | 12/2002 | Wewalaarachchi et al. |
| 6,397,155 | B1 | 5/2002 | Przydatek et al. | 2003/0005112 A1 * | 1/2003 | Krautkremer ................ 709/224 |
| 6,405,104 | B1 | 6/2002 | Dougherty | 2003/0043785 A1 | 3/2003 | Liu et al. |
| 6,406,328 | B1 | 6/2002 | Attarian et al. | 2003/0071633 A1 * | 4/2003 | Fedirchuk et al. ........... 324/529 |
| 6,411,865 | B1 | 6/2002 | Qin et al. | 2004/0015583 A1 * | 1/2004 | Barrett et al. ................ 709/224 |
| 6,441,931 | B1 | 8/2002 | Moskovich et al. | 2005/0138432 A1 * | 6/2005 | Ransom et al. .............. 713/201 |
| 6,459,997 | B1 | 10/2002 | Anderson | | | |
| 6,496,342 | B1 | 12/2002 | Horvath et al. | FOREIGN PATENT DOCUMENTS | | |
| 6,535,797 | B1 | 3/2003 | Bowles et al. | | | |
| 6,549,880 | B1 | 4/2003 | Willoughby et al. | EP | 0723325 A1 | 7/1996 |
| 6,553,418 | B1 | 4/2003 | Collins et al. | EP | 0949734 A2 | 10/1999 |
| 6,560,084 | B1 * | 5/2003 | Bilac et al. ................. 361/93.1 | | | |
| 6,694,271 | B1 * | 2/2004 | Hannon ....................... 702/58 | * cited by examiner | | |

METHOD AND APPARATUS FOR MINIMALLY INVASIVE NETWORK MONITORING

CROSS REFERENCE TO RELATED APPLICATIONS

This application is related to U.S. Patent Application No. 60/359,544 filed on Feb. 25, 2002 for "Integrated Protection, Monitoring, and Control" the content of which is incorporated in its entirety herein by reference. This application is also related to U.S. Patent Application No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for facilitating monitoring central control communication networks implementing such control.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or deenergized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method for monitoring a communication network is provided. The network includes a plurality of node electronics units communicatively coupled to at least one central control processing unit through at least one network wherein each network includes a network switch, and wherein the method comprises coupling a monitoring domain to the network wherein the monitoring domain includes at least one of a node to be monitored, a monitoring node, and a network coupler wherein the node to be monitored is communicatively coupled to at least one monitored link, and wherein the monitoring node is communicatively coupled to at least one monitoring link, and receiving at least one of network traffic transmitted on at least one of the monitored links, and network traffic received on at least one of the monitored links through at least one monitoring link.

In another aspect, an apparatus for monitoring a communication network is provided. The network includes a plurality of node electronics units communicatively coupled to at least one central control processing unit through at least one network wherein each network includes a network switch wherein the apparatus includes a monitoring domain.

DETAILED DESCRIPTION OF THE INVENTION

Figure 1:
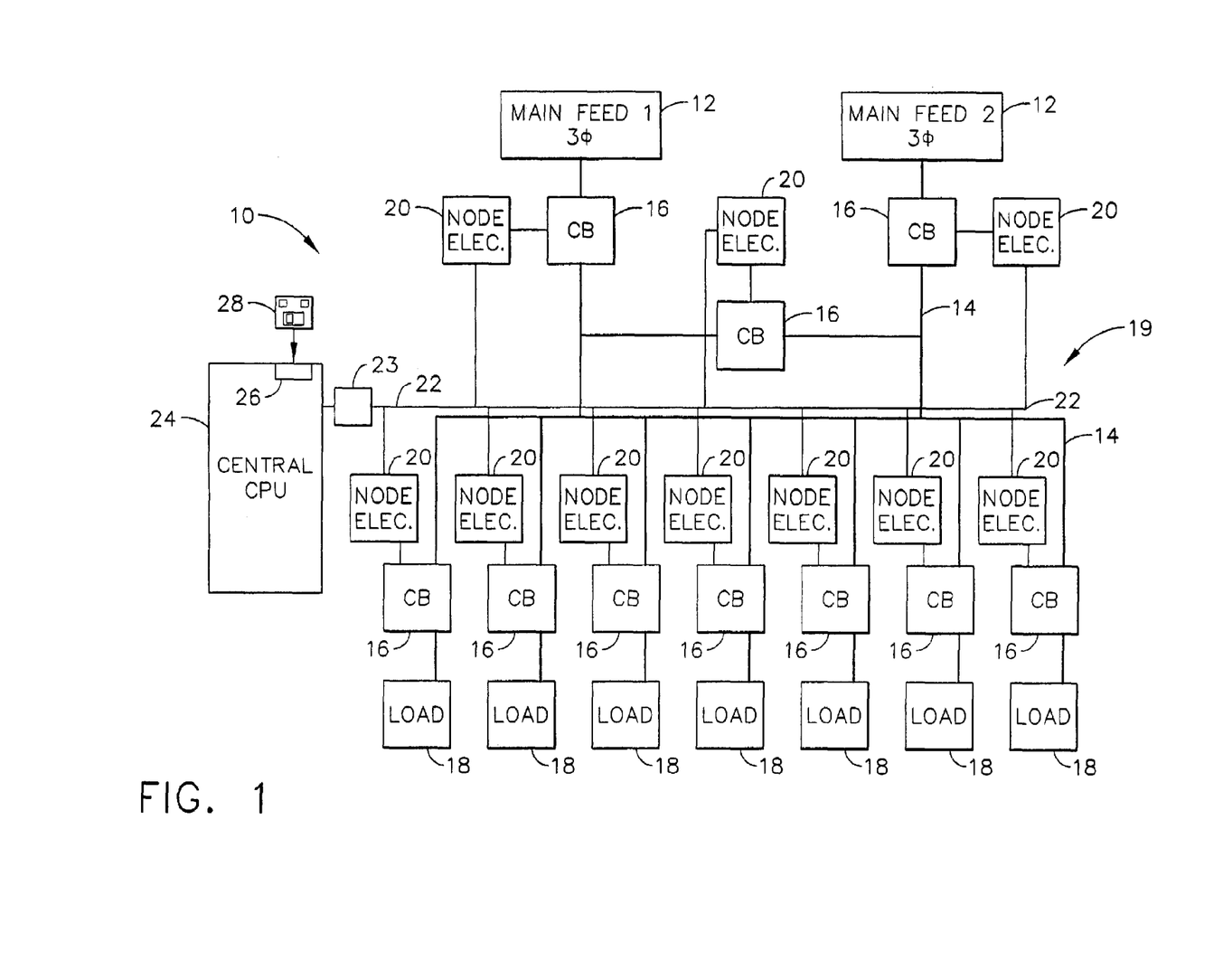
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
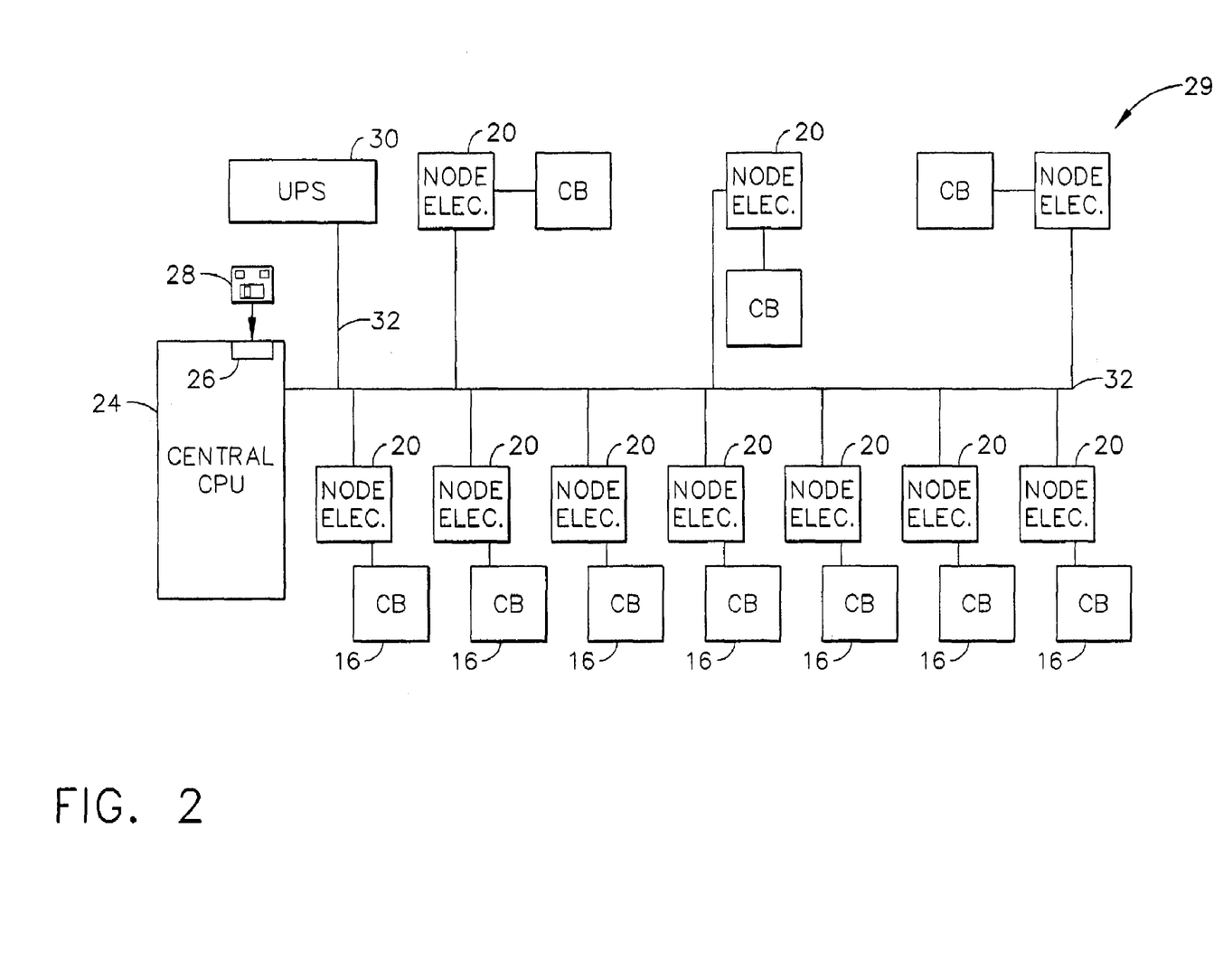
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
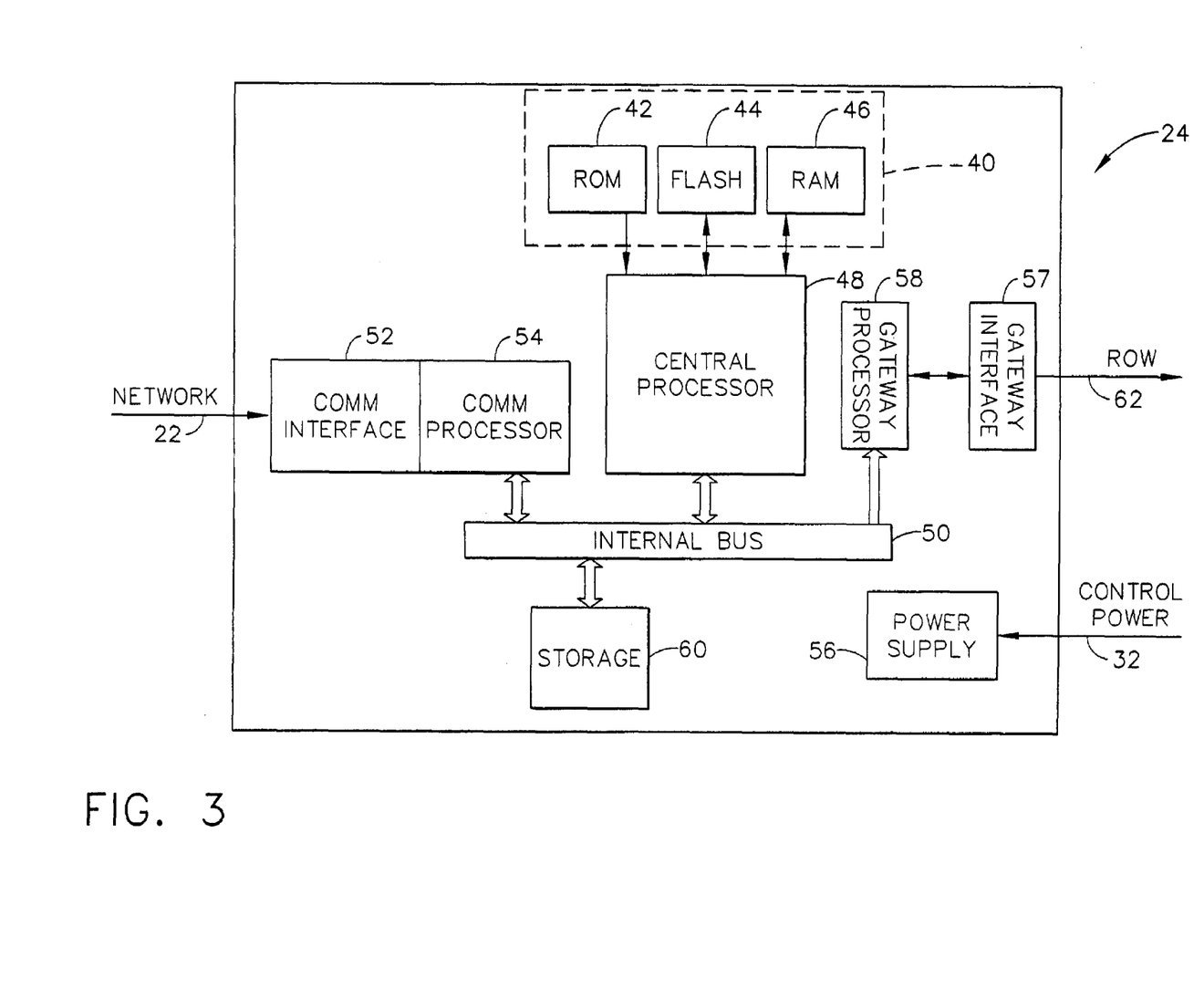
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
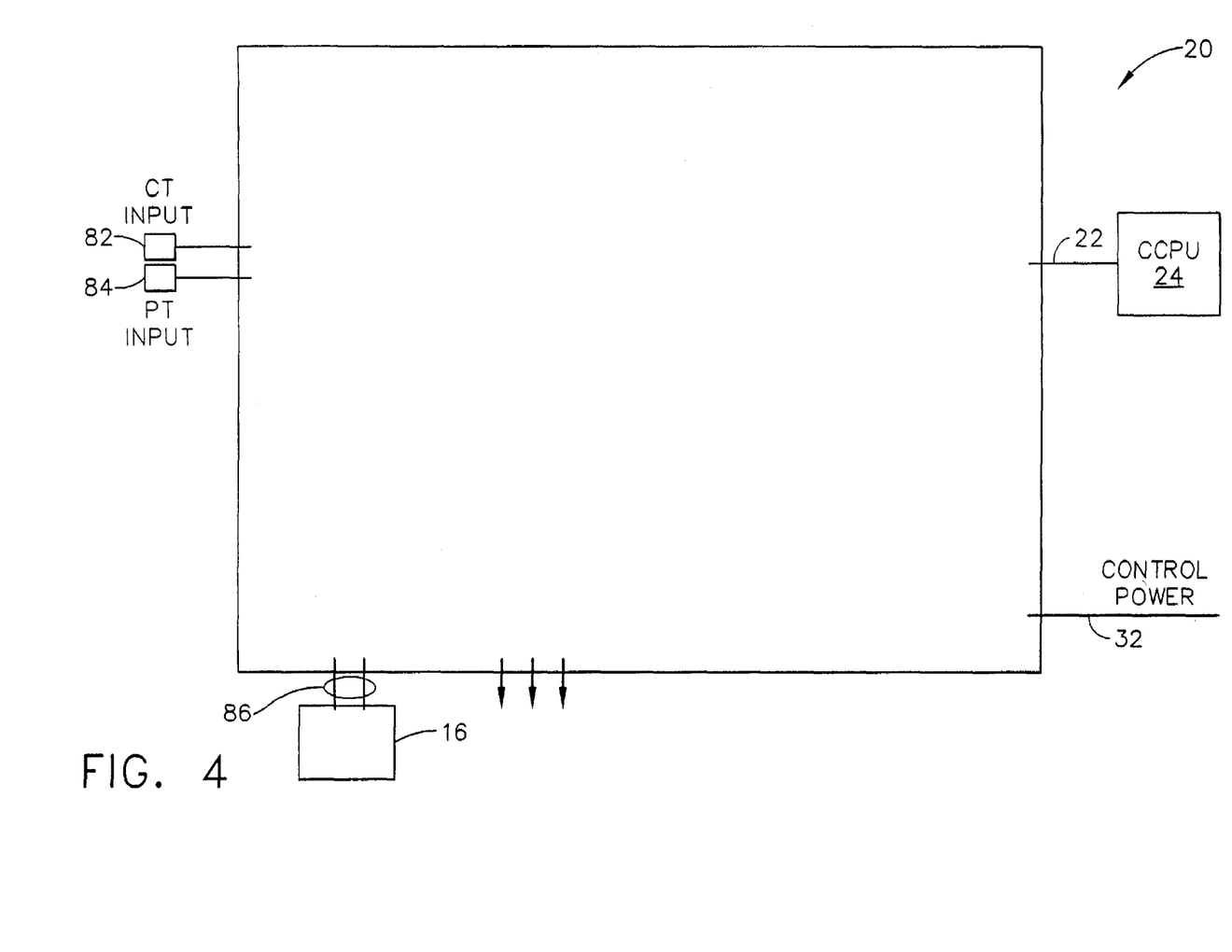
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
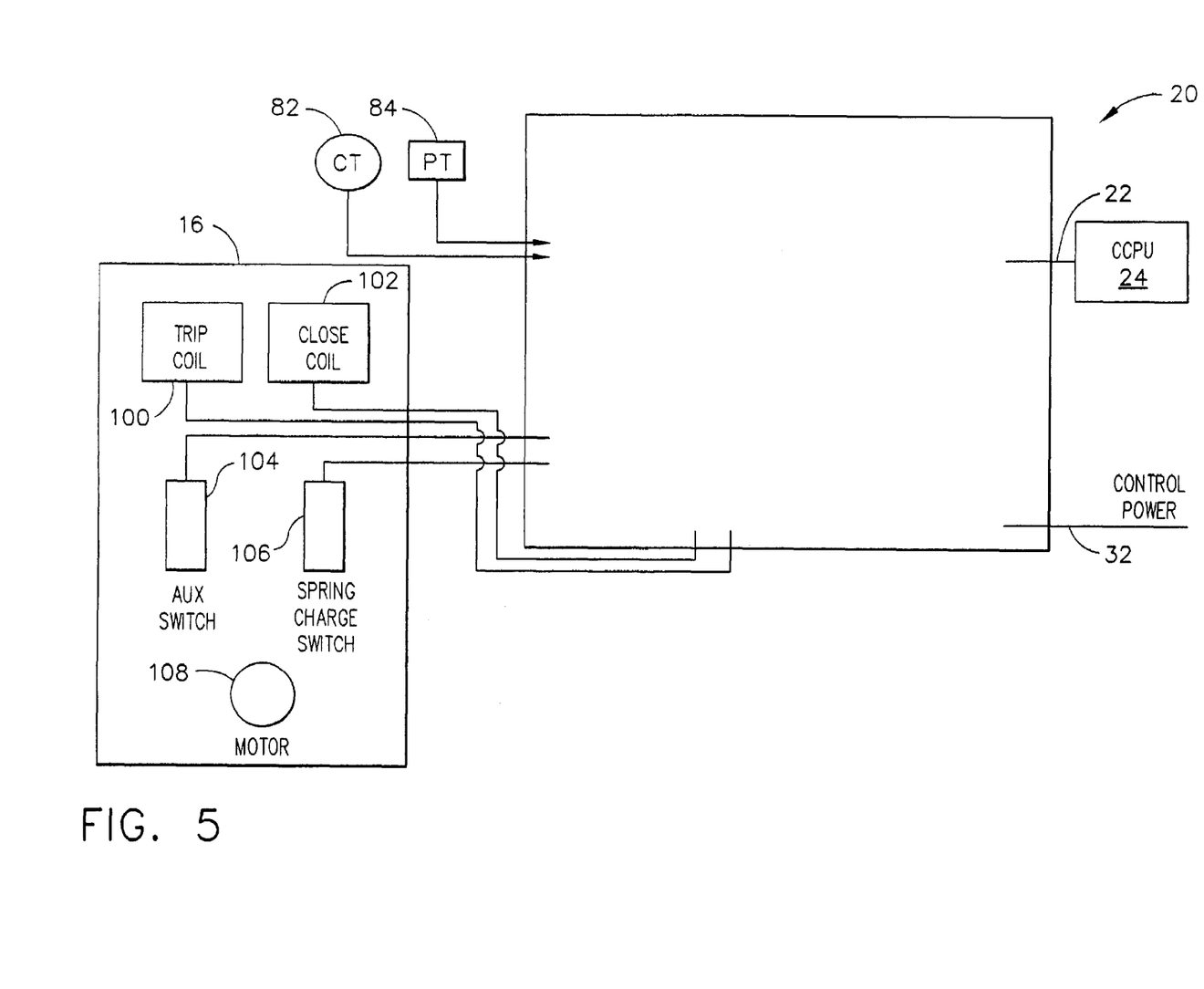
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electro-mechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
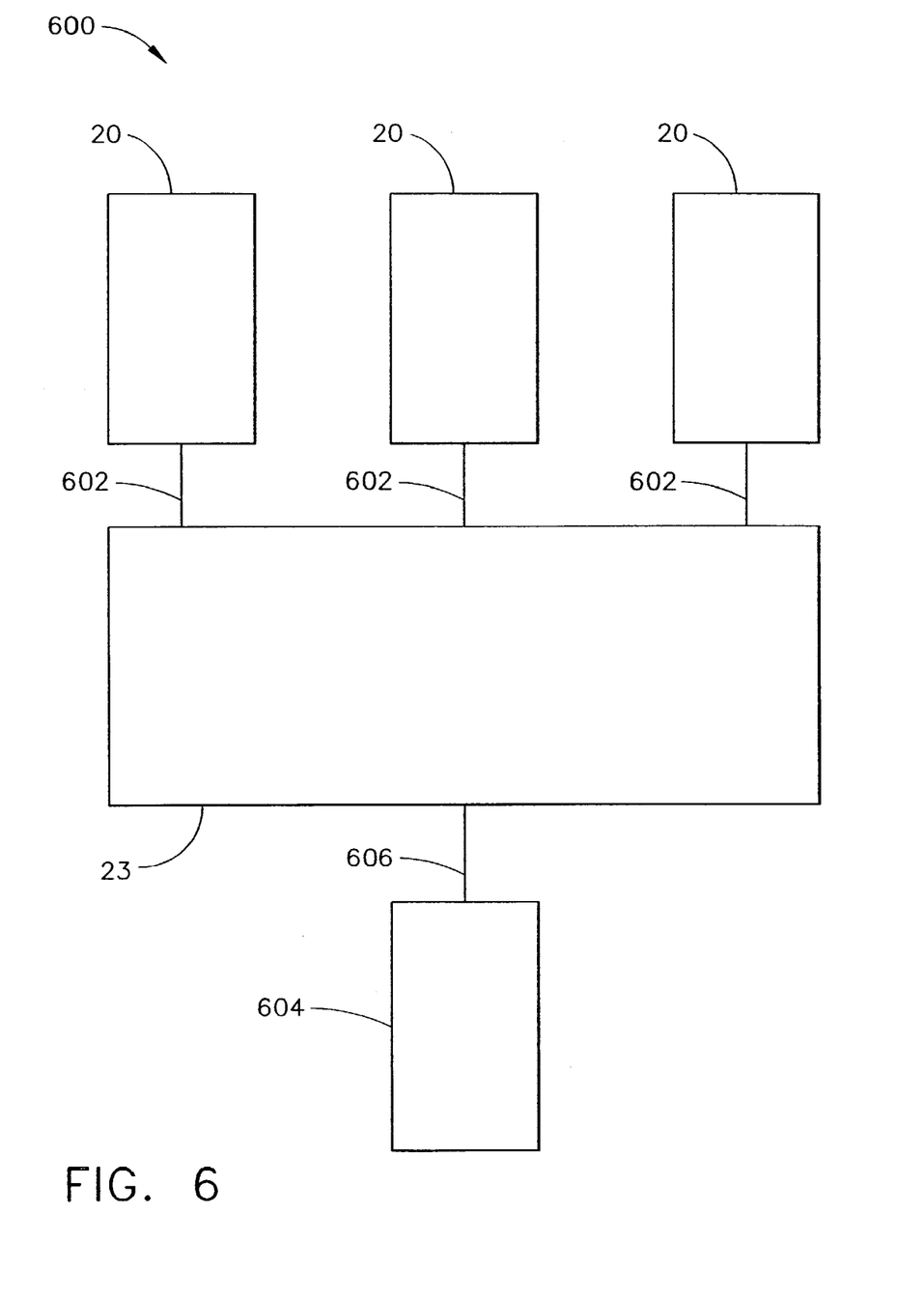
FIG. 6 is a simplified block diagram of an exemplary network to be monitored that may be used with the power distribution system shown in FIG. 1.

FIG. 6 is a simplified block diagram of an exemplary network to be monitored 600 that may be used with power distribution system 10 shown in FIG. 1. In the exemplary embodiment, one network 22 of a redundant multi-network architecture is illustrated. Network to be monitored 600 includes a plurality of node electronics units 20 communicatively coupled to a network switch 23 via a network segment 602 corresponding to each node electronics unit 20. Switch 23 is communicatively coupled to a node to be monitored 604 via a link to be monitored 606. Node to be monitored 604 may be any network device connected to network to be monitored 600, for example, but, not limited to a node electronics unit 20 and a CCPU 24.

In operation, node electronics units 20 communicate electrical parameters and component states of power distribution system 10 to CCPU 24 and CCPU 24 via network 600. Additionally, CCPU 24 communicates commands and actions, synchronization information and other instructions to node electronics unit 20 via network 600. Switch 23 facilitates communication on network 600. Monitoring traffic on network 600 facilitates system maintainability and troubleshooting of components of power distribution system 10 and components of network 600.

Figure 7:
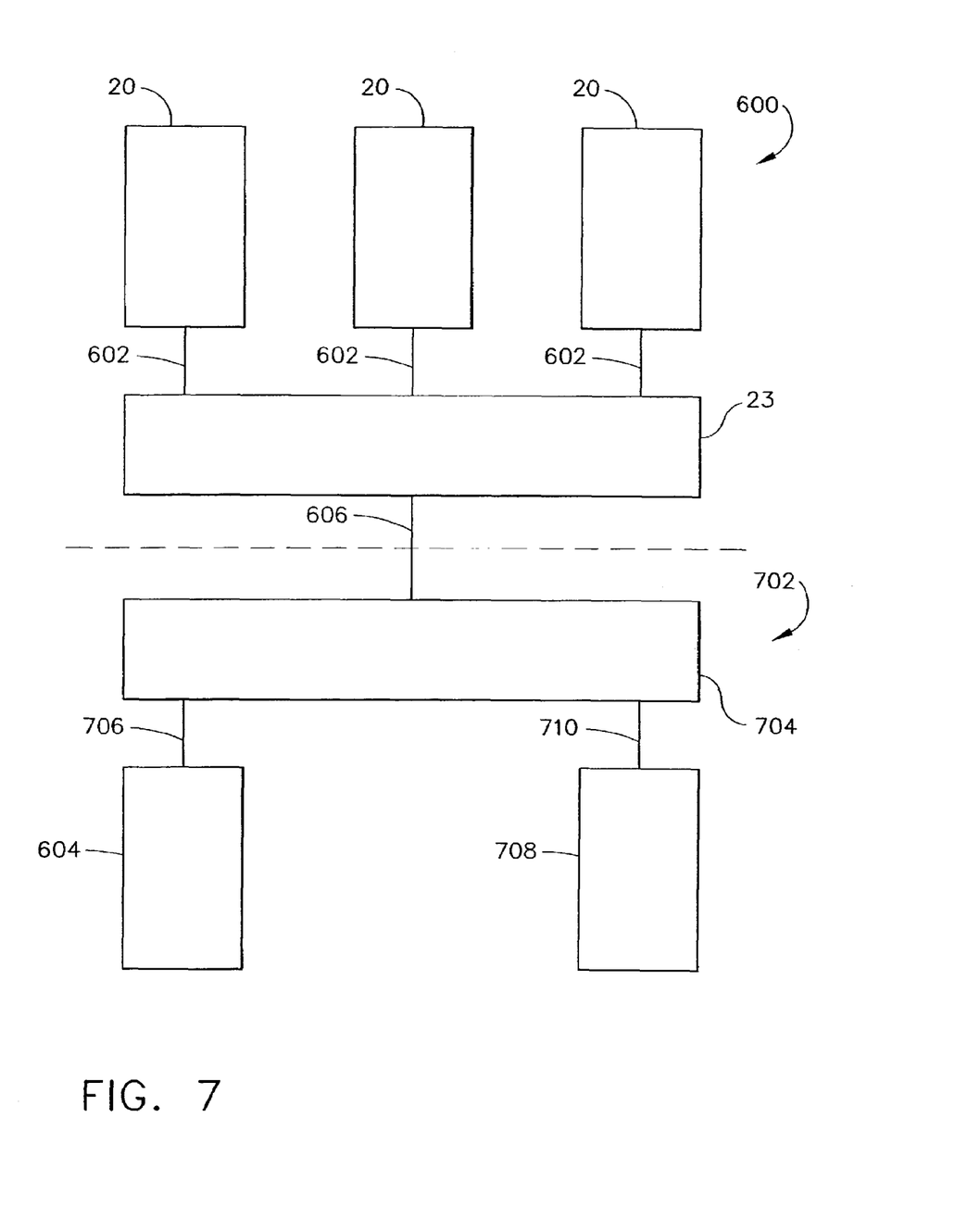
FIG. 7 is a simplified block diagram of an exemplary embodiment of a network monitoring system that may be used with the power distribution system shown in FIG. 1.

FIG. 7 is a simplified block diagram of an exemplary embodiment of a network monitoring system 702 that may be used with power distribution system 10 shown in FIG. 1.

Network monitoring system or monitoring domain 702 includes a network coupler 704 communicatively coupled, for example by electromagnetic coupling, optical coupling, evanescent coupling and/or contact coupling, to network 600 via link to be monitored 606. In the exemplary embodiment, network coupler is a network hub. In an alternative embodiment, network coupler 704 may be a network switch and/or cable adapter. Hub 704 is also communicatively coupled to node to be monitored 604 via a monitored link 706 and is communicatively coupled to a monitoring node 708 via a monitoring link 710. Hub 704 facilitates coupling monitoring node 708 to network 600 while maintaining communication between node to be monitored 604 and network 600. When network coupler 704 comprises a network switch, the switch includes at least one service port, and a configurable switching fabric which allows selective transmission of network traffic from other switch ports to the at least one service port. In the exemplary embodiment, monitoring node 708 includes a personal computer executing a software product code segment that includes standard and custom network monitoring functions. In an alternative embodiment, monitoring node 708 may include at least one of a laptop computer, a server, a mainframe computer a PDA, and a dedicated network monitor computer.

In operation, data transmitted to node to be monitored 604 through link to be monitored 606 passes through hub 704 where the data signal is split and transmitted to monitoring node 708. Likewise, data transmitted from node to be monitored 604 through monitored link 706 passes through hub 704 where the data signal is split and transmitted to monitoring node 708. Hub 704 may be a network device with little intelligence that is a connection point for the monitoring node to gain access to network traffic transmitted to a from node to be monitored 604. Hub 704 may pass the network data passively, for example, by providing only a connection point to the network, or hub 704 may pass the network data actively, for example, via signal repeaters.

Figure 8:
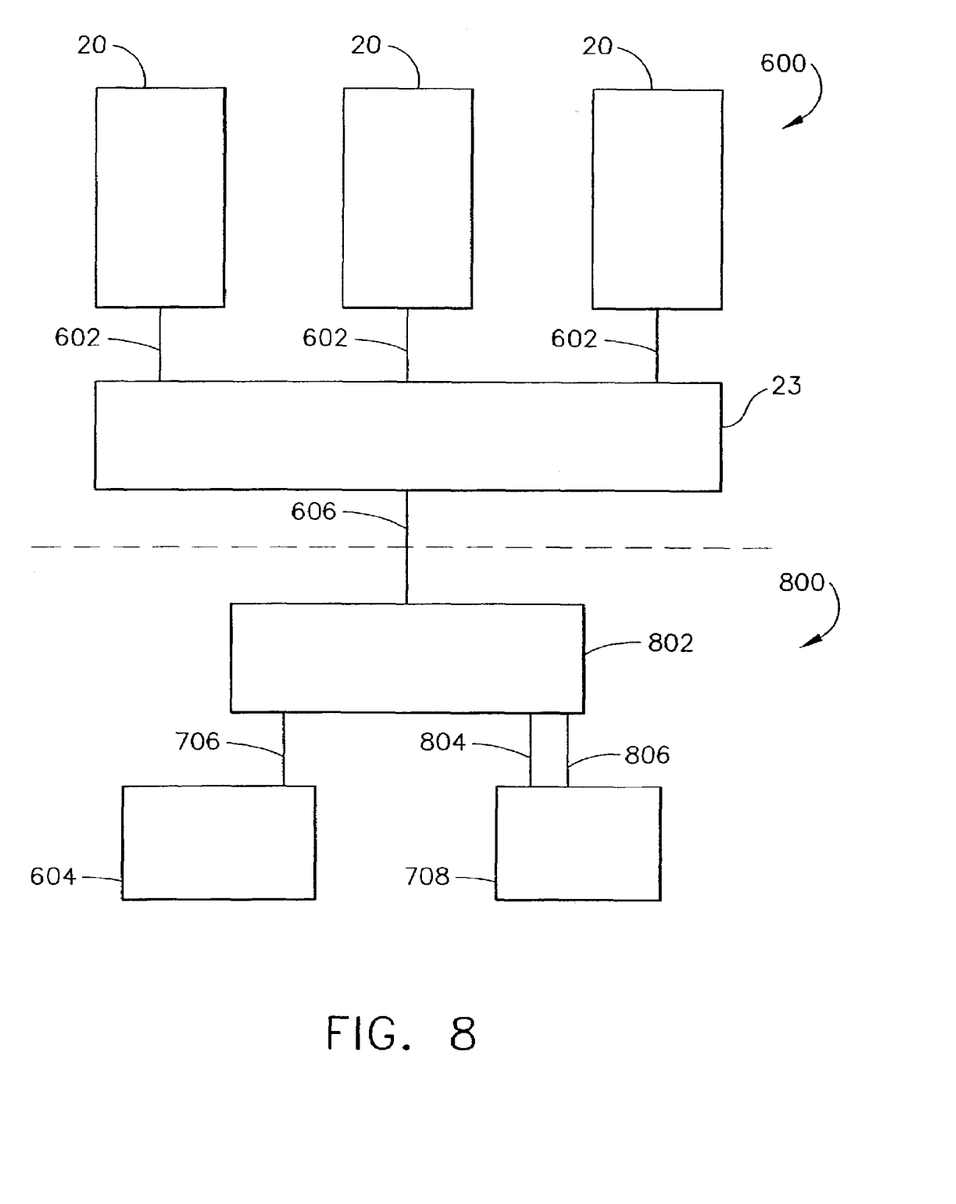
FIG. 8 is a simplified block diagram of another exemplary embodiment of a network monitoring system that may be used with the power distribution system shown in FIG. 1.

FIG. 8 is a simplified block diagram of another exemplary embodiment of a network monitoring system or monitoring domain 800 that may be used with power distribution system 10 shown in FIG. 1. Network monitoring system 800 includes a cable adapter 802 communicatively coupled to network 600 via link to be monitored 606. Cable adapter 802 is also communicatively coupled to node to be monitored 604 via monitored link 706 and is communicatively coupled to monitoring node 708 via a monitoring node transmit connection link 804 and a monitoring node receive connection link 806. Cable adapter 802 facilitates coupling monitoring node 708 to network 600 while maintaining communication between node to be monitored 604 and network 600.

In operation, data transmitted to node to be monitored 604 through link to be monitored 606 passes through cable adapter 802 where the data signal is split and transmitted to monitoring node 708 through monitoring node transmit connection link 804. Likewise, data transmitted from node to be monitored 604 through monitored link 706 passes through cable adapter 802 where the data signal is split and transmitted to monitoring node 708 through monitoring node receive connection link 806. Cable adapter 802 may be a network device with little intelligence that is a connection point for the monitoring node to gain access to network traffic transmitted to a from node to be monitored 604. Cable adapter 802 may pass the network data passively, for example, by providing only a connection point to the network, or cable adapter 802 may pass the network data actively, for example, via signal repeaters. Monitoring node 708 may be configured to not transmit on monitoring link and operate in promiscuous mode (i.e. deliver to monitoring software all messages received on monitoring links 804 and 806). Monitoring software is run on monitoring node 708 to process and/or log monitored traffic as needed. For example, the monitoring software can monitor traffic in response to a predetermined traffic pattern. This embodiment supports full duplex operation of link to be monitored 606, and is therefore non-invasive. Monitoring cable/monitoring cable adapter 802 allows traffic to and from the node to be monitored 604 to be simultaneously transmitted to monitoring node 708.

In the exemplary embodiment, monitoring node 708 is described as a computer executing a software program code segment to implement functions of the invention. In other embodiments, the software program code segment may be implemented as a combination of program modules, or in combination with other program modules. Generally, program modules include routines, programs, components, data structures, etc. that perform particular tasks or implement particular abstract data types. In addition, the software program code segment may be implemented as a distributed application, one including program modules located on different computers in a distributed computing environment.

Figure 9:
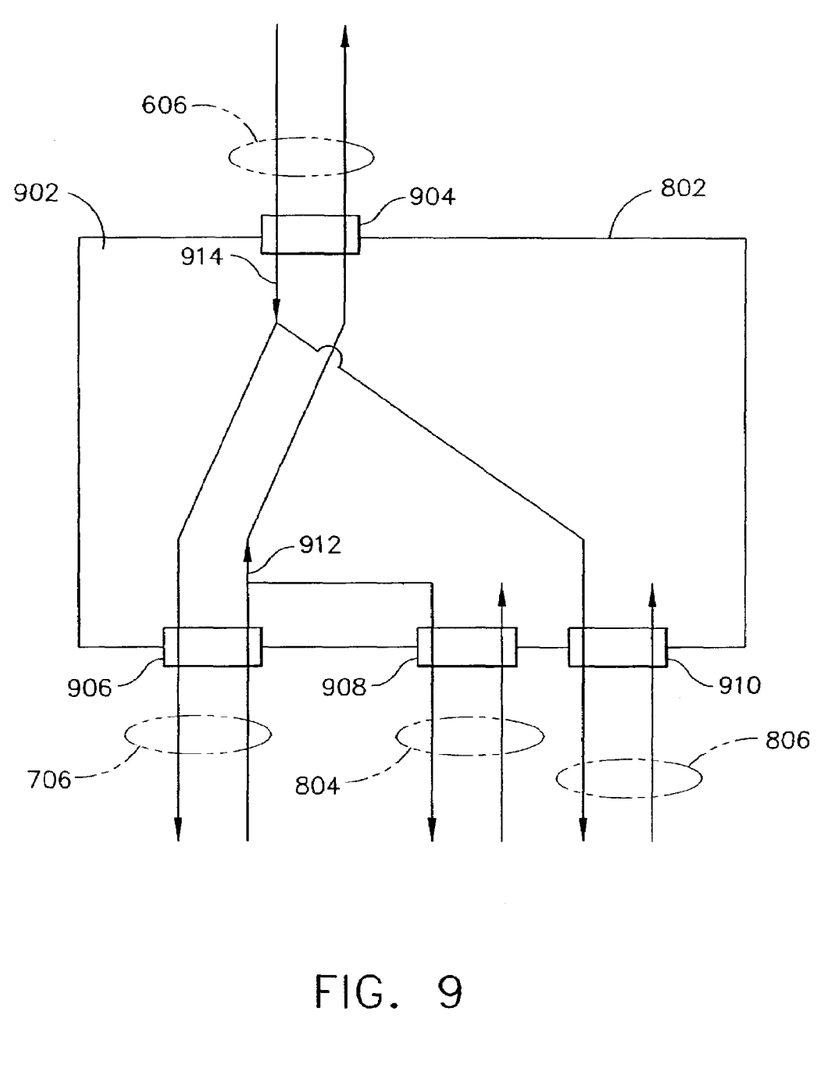
FIG. 9 is a schematic diagram of a monitoring cable/monitoring cable adapter that may be used with the network monitoring system shown in FIG. 8.

FIG. 9 is a schematic diagram of monitoring cable/monitoring cable adapter 802 that may be used with network monitoring system 800 shown in FIG. 8. Adapter 802 includes a body 902 that supports a first connector 904. Connector 904 couples link to be monitored 606 to adapter 802. A second connector 906 couples monitored link 706 to adapter 802. A third connector 908 couples monitoring node transmit connection link 804 to adapter 802. A fourth connector 910 couples monitoring node receive connection link 806 to adapter 802. Internal to adapter 802, connector 904 is communicatively coupled to connector 906. Network traffic transmitted to and from node to be monitored 604 is routed in full duplex from connector 904 to connector 906. A portion of connector 908 is communicatively coupled to a transmit portion 912 of connector 906. A portion of connector 910 is communicatively coupled to a receive portion 914 of connector 904. Connectors 908 and 910 are coupled to portions 912 and 914 respectively, in a simplex mode, such that, network traffic moves only one direction through each respective connector. This embodiment supports full duplex operation of link to be monitored 606, and is therefore non-invasive. Monitoring cable/monitoring cable adapter 802 allows traffic to and from the node to be monitored 604 to be simultaneously transmitted to monitoring node 708.

The above-described power distribution system network monitoring system is cost-effective and highly reliable. Each system includes at least one central control processing unit (CCPU) and a plurality of node electronics unit communicatively coupled via a high-speed digital network. There may be additional CCPUs and corresponding network backbones coupled in the power distribution system to facilitate meeting a system reliability goal. Each node electronics unit communicates to every CCPU via a digital message packet that facilitates efficient communication while maintaining a system latency requirement. Accordingly, the power distribution system communication system facilitates protection and optimization of power system operation in a cost-effective and reliable manner.

Exemplary embodiments of power distribution system communication system components are described above in detail. The components are not limited to the specific embodiments described herein, but rather, components of each system may be utilized independently and separately from other components described herein. Each power distribution system communication system component can also be used in combination with other power distribution system components.

While the invention has been described in terms of various specific embodiments, those skilled in the art will recognize that the invention can be practiced with modification within the spirit and scope of the claims.

What is claimed is:

1. A method for monitoring a communication network that includes a plurality of node electronics units communicatively coupled to at least one central control processing unit through at least one network wherein each network includes a network switch, and wherein the method comprises the steps of:
   coupling a monitoring domain to the network wherein the monitoring domain includes at least one of a node to be monitored, a monitoring node, and a network coupler wherein the node to be monitored is communicatively coupled to at least one monitored link, and wherein the monitoring node is communicatively coupled to at least one monitoring link; and
   receiving at least one of network traffic transmitted on at least one of the monitored links, and network traffic received on at least one of the monitored links through at least one monitoring link, wherein said network traffic comprises a plurality of first signals representative of current and/or voltage that are transmitted to said at least one central control processing unit from said plurality of node electronics units and said network traffic comprises a circuit breaker trip command that is transmitted to said plurality of node electronics units from said at least one central control processing unit in response to said first signals.

2. A method in accordance with claim 1 wherein the network coupler comprises a network hub, and wherein coupling a monitoring domain to the network comprises:
   communicatively coupling a network hub to the network; and
   communicatively coupling the network hub to the monitored link, and the monitoring links.

3. A method in accordance with claim 1 wherein coupling a monitoring domain to the network comprises operating the monitored link in a full duplex mode such that a collision domain is not created.

4. A method in accordance with claim 3 further comprising:
   receiving on the receive channel of a first monitoring link the traffic on the transmit channel of the monitored link; and
   receiving on the receive channel of a second monitoring link the traffic on the receive channel of the monitored link.

5. A method in accordance with claim 4 further comprising splitting network traffic signals passively.

6. A method in accordance with claim 4 further comprising splitting network traffic signals actively.

7. A method in accordance with claim 1 wherein monitoring a communication network comprises monitoring a communication network within a centrally-controlled power distribution system.

8. A method in accordance with claim 1 wherein coupling a monitoring domain to the network comprises communicatively coupling the network coupler to at least one of the network, the monitoring link, and the monitored link.

9. A method in accordance with claim 8 wherein coupling a monitoring domain to the network comprises communicatively coupling, the network coupler using at least one of electromagnetic coupling, optical coupling, evanescent wave coupling, and contact coupling.

10. A method in accordance with claim 8 wherein coupling a monitoring domain to the network further comprises disconnecting the node to be monitored from the network.

11. A method in accordance with claim 1 wherein coupling a monitoring domain to the network comprises coupling a monitoring domain to the network wherein the network coupler includes a switch wherein the switch includes at least one of a service port, and a configurable switching fabric such that incoming traffic from a plurality of other switch ports is repeated to the service port.

12. A method in accordance with claim 1 wherein coupling a monitoring domain to the network comprises coupling a monitoring domain to the network wherein the monitoring node includes a network coupler.

13. A method in accordance with claim 1 wherein coupling a monitoring domain to the network further comprises abstaining from transmitting signals on the monitoring link by the monitoring node.

14. A method in accordance with claim 1 wherein coupling a monitoring domain to the network comprises coupling a monitoring domain to the network wherein the monitoring node includes at least one of a personal computer, a laptop computer, a server, a mainframe computer, and a dedicated network monitor computer.

15. A method in accordance with claim 1 wherein the monitoring node includes a monitoring process, said method further comprises:
   identifying network operating conditions; and
   responding to identified conditions based on at least one of received traffic, external inputs, and predetermined criteria.

16. A method in accordance with claim 15 wherein identifying network operating conditions comprises identifying at least one of anomalous system behavior, normal system behavior, predicted system behavior, system trends, periodic interrupts, and external commands.

17. A method in accordance with claim 15 wherein said monitoring process comprises at least one of logging received traffic, calculating system statistics, reporting operating conditions, alarming, operating condition prediction, and system diagnosis.

18. A method in accordance with claim 17 wherein logging received traffic comprises logging at least one of digital data, and a digital representation of analog data.

19. A method in accordance with claim 18 wherein logging received traffic comprises displaying received data graphically through digital oscillography.

20. A method in accordance with claim 15 wherein said monitoring process comprises reconfiguring the monitoring process.

21. A method in accordance with claim 15 wherein the monitoring node includes a plurality of service interfaces, and wherein said monitoring process comprises using a service interface for at least one of reconfiguring the monitoring process, displaying data externally, and reporting data externally.

22. A method in accordance with claim 15 wherein said monitoring process comprises monitoring the network in real-time.

23. An apparatus for monitoring a communication network wherein the communication network includes a plurality of node electronics units communicatively coupled to at least one central control processing unit through at least one network wherein each network includes a network switch, and wherein the apparatus comprises a monitoring domain, said plurality of node electronics units each being in electrical communication with a circuit breaker, the communication network communicating network traffic between the at least one centra control processing unit and the plurality of node electronics units, wherein said network traffic comprises a plurality of first signals representative of current and/or voltage that are transmitted to said at least one central control processing from said plurality of node electronics units and said network traffic comprises a circuit breaker trio command that is transmitted to said plurality of node electronics units from said at least one central control processing unit in response to said first signals.

24. An apparatus in accordance with claim 23 wherein said monitoring domain comprises:
- at least one network coupler communicatively coupled to the network;
- at least one monitoring link communicatively coupled to said network coupler and to a respective monitoring node;
- at least one monitored link communicatively coupled to said network coupler and to a respective node to be monitored.

25. An apparatus in accordance with claim 23 wherein said network coupler comprises a hub.

26. An apparatus in accordance with claim 23 wherein said network coupler is configured to enable said monitored link to operate in a full duplex mode without creating a collision domain.

27. An apparatus in accordance with claim 26 wherein said network coupler is configured to split network traffic signals passively.

28. An apparatus in accordance with claim 26 wherein said network coupler is configured to split network traffic signals actively.

29. An apparatus in accordance with claim 23 wherein said monitoring node is configured to operate in a promiscuous mode such that said monitoring node receives all traffic transmitted to and from said node to be monitored.

30. An apparatus in accordance with claim 23 wherein said network coupler is communicatively coupled through at least one of electromagnetic coupling, optical coupling, evanescent wave coupling, and contact coupling.

31. An apparatus in accordance with claim 23 wherein said network coupler comprises a switch that comprises at least one service port, and switching fabric configured to repeat incoming traffic from a plurality of switch ports to said service port.

32. An apparatus in accordance with claim 23 wherein said monitoring node is configured to abstain from transmitting on said monitoring links.

33. An apparatus in accordance with claim 23 wherein said monitoring node comprises at least one of a personal computer, a laptop computer, a PDA, a server, a mainframe computer, and a dedicated network monitor computer.

34. An apparatus in accordance with claim 23 wherein said monitoring node is configured to display received data graphically through digital oscillography.

35. An apparatus in accordance with claim 23 wherein said monitoring node further comprises a plurality of service interfaces, said interfaces configured to reconfigure said monitoring process, display data externally, and generate reports.

36. An apparatus in accordance with claim 35 wherein at least one service interface comprises an interface to at least one local I/O device, and at least one interface comprises an interface to at least one remote network.

37. A method for monitoring a communication network of a power distribution system, comprising:
- connecting a splitting device in electrical communication with a node of the power distribution system so that communications between the communication network and said node are simultaneously transmitted through said splitting device to a monitoring node and a central control processing unit; and
- controlling said monitoring node to receive said communications but not to transmit said communications wherein said communications comprises a plurality of first signals representative of current and/or voltage that are transmitted to said at least one central control processing unit from said node and said communications comprises a circuit breaker trip command that is transmitted to said node from said node at least one central control processing unit in response to said first signals.

38. The method as in claim 37, wherein said splitting device allows said communications to be simultaneously transmitted to said node and said monitoring node.

39. The method as in claim 38, wherein said splitting device is a network hub or a cable adapter.

* * * * *